United States Patent [19]

Mortenson

[11] Patent Number: 4,762,333
[45] Date of Patent: Aug. 9, 1988

[54] REPOSITIONABLE HAND TRUCK

[75] Inventor: Carl N. Mortenson, Midland, Mich.

[73] Assignee: Magline, Inc., Pinconning, Mich.

[21] Appl. No.: 364

[22] Filed: Jan. 5, 1987

[51] Int. Cl.$^4$ .............................................. B62B 1/12
[52] U.S. Cl. ................................ 280/43.1; 280/47.21
[58] Field of Search ................ 280/47.21, 47.22, 47.2, 280/5.28, 5.32, 43.1; 298/2; 414/490

[56] References Cited

U.S. PATENT DOCUMENTS

| | | | |
|---|---|---|---|
| 1,201,957 | 10/1916 | Hall | 280/47.21 |
| 1,452,135 | 4/1923 | Adams | 280/47.21 |
| 1,965,943 | 7/1934 | Lea | 280/43.1 |
| 1,965,944 | 7/1934 | Lea | 280/47.21 X |
| 2,080,332 | 5/1937 | Van Wulfften Palthe | 280/47.21 |
| 2,096,994 | 10/1937 | Millen | 280/47.21 X |
| 2,607,606 | 8/1952 | Millen | 280/47.21 X |
| 2,710,106 | 6/1955 | Hanson | 280/47.21 X |
| 3,997,182 | 12/1976 | Mortenson | 280/47.27 |
| 4,121,855 | 10/1978 | Mortenson | 280/47.29 X |
| 4,275,894 | 6/1981 | Mortenson | 280/47.29 X |
| 4,563,014 | 1/1986 | Mortenson | 280/47.27 X |

FOREIGN PATENT DOCUMENTS

| | | |
|---|---|---|
| 828164 | 1/1952 | Fed. Rep. of Germany . |
| 1281274 | 10/1968 | Fed. Rep. of Germany . |
| 657835 | 9/1951 | United Kingdom . |
| 697210 | 9/1953 | United Kingdom . |

Primary Examiner—David M. Mitchell
Assistant Examiner—Tamara L. Finlay
Attorney, Agent, or Firm—Learman & McCulloch

[57] ABSTRACT

A two-wheeled hand truck incorporates an elongate upright frame, mounted by a pair of wheel support brackets to supporting wheels. Handles or other graspable surfaces are provided at the upper end of the frame. The wheel-supporting brackets are pivotally connected to the frame in a manner to permit movement of the wheels from a first load-supporting position in which the wheels are adjacent the lower end of the frame for supporting loads with a relatively lower center of gravity, to a second load-supporting position in which the wheels and axle are moved materially rearward for supporting loads with a relatively higher center of gravity. Yieldable, pressure-exerting mechanism operating through moment arms on opposite sides of the brackets pivots releasably lock the wheel structure in each of its positions.

12 Claims, 4 Drawing Sheets

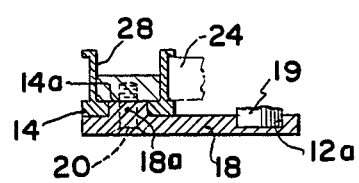
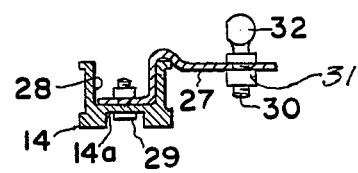
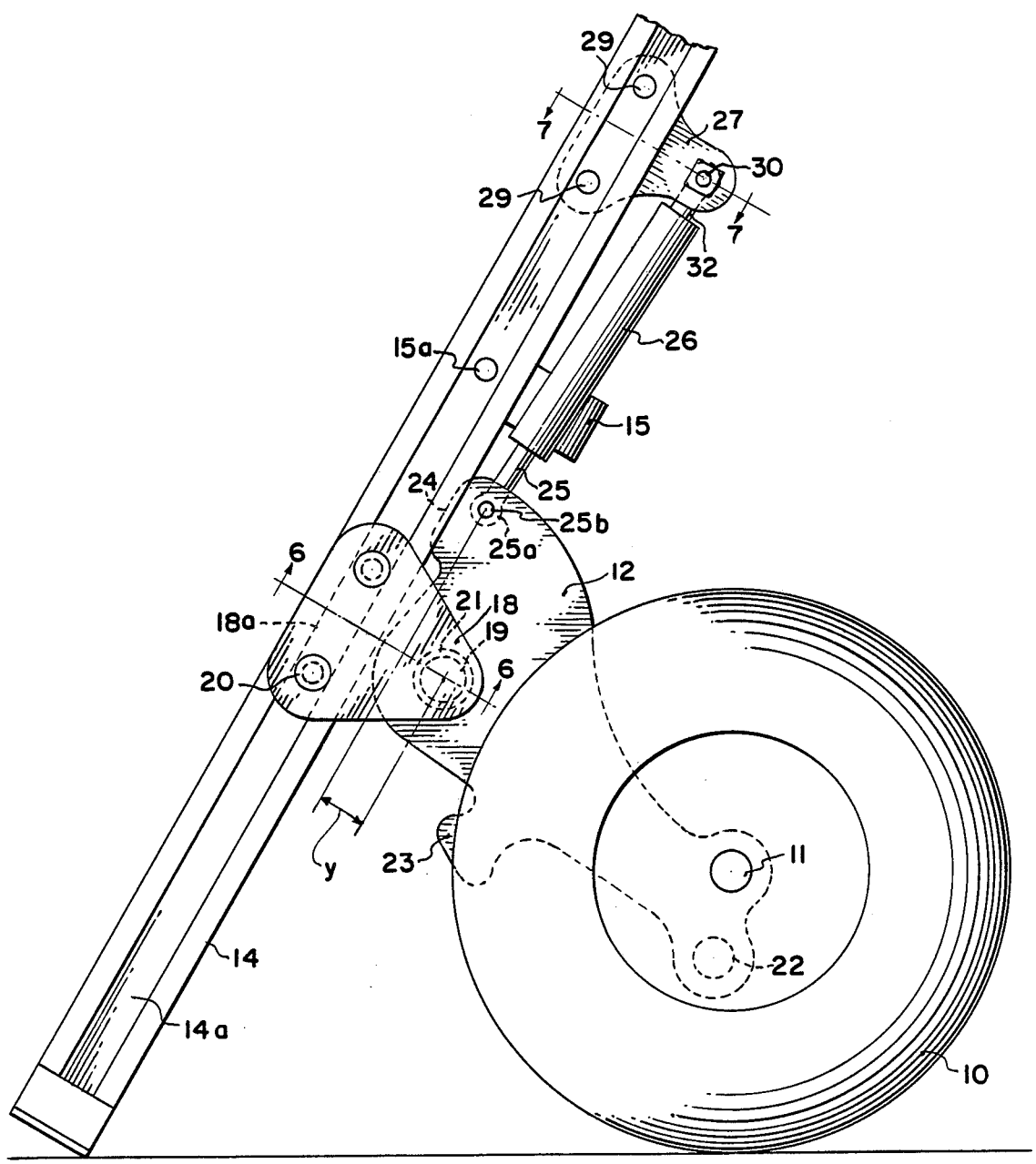

REPOSITIONABLE HAND TRUCK

BACKGROUND OF THE INVENTION

This invention relates to certain new and useful improvements in two-wheeled hand trucks of the type used to transport relatively heavier loads which are of such bulk and weight that it is not practical to attempt to carry them without vehicular assistance. Among patents which relate generally to hand trucks of this character are the hand trucks illustrated in the following U.S. patents:

| | |
|---|---|
| 1,452,135 | |
| 1,965,944 | 2,710,106 |
| 2,080,332 | 4,121,855 |
| 2,096,994 | 4,275,894 |
| 2,607,606 | 4,563,014 |

Several of the above patents are owned by the present inventor's assignee, and, as noted in U.S. Pat. No. 4,275,894, for example, the loads to which a hand truck is subjected can vary within wide limits, and the loads will have a wide range of centers of gravity, dependent upon the shape, bulk and heft of the product being carried. Normally hand trucks of this type, which are used for a wide variety of purposes, including transporting kegs of beer, cases of soft drinks, and baggage, for example, provide wheel-supporting brackets which are fixed to the hand truck frame. Hand trucks which are designed with a particular use in mind can be designed to best handle a load having a known center of gravity, but will not handle as well for loads having considerably different centers of gravity.

One of the prime objects of the present invention is to provide a more versatile hand truck which has a manipulatable wheel structure which can move from a first position adjacent the lower end of the frame for handling loads with a relatively low center of gravity, to a second rearwardly removed position for handling loads with a relatively higher center of gravity.

A corollary object of the invention is to provide a hand truck which is inherently balanced, when in operation with the wheeled structure in either of the positions mentioned.

A further object of the invention is to provide a hand truck of this character which utilizes overcomeable, yieldable, resistance exerting members operating through a predetermined moment arm to releasably lock the wheel structure in one or the other positions relative to the frame.

Still another object of the invention is to provide a hand truck of the character described which is supported for rolling movement solely by the wheel structure, and does not require the use of additional supporting wheels in either of the positions in which the hand truck is used.

Still a further object of the invention is to provide a heavy duty hand truck of the character described which does not depend upon mechanical latches or similar devices which need to be manipulated by the user for maintaining the repositionable wheel structure in either of its positions, the hand truck at all times being, for practical purposes, automatically locked in either of the positions.

Other objects and advantages of the invention will become apparent by reference to the following specification and to the drawings.

IN THE DRAWINGS

FIG. 5 is an enlarged, fragmentary, elevational view illustrating certain of the parts in greater detail;

FIG. 6 is a transverse, sectional view, taken on the line 6—6 of FIG. 5; and

FIG. 7 is a transverse, sectional view taken on the line 7—7 of FIG. 5.

Figure 1:
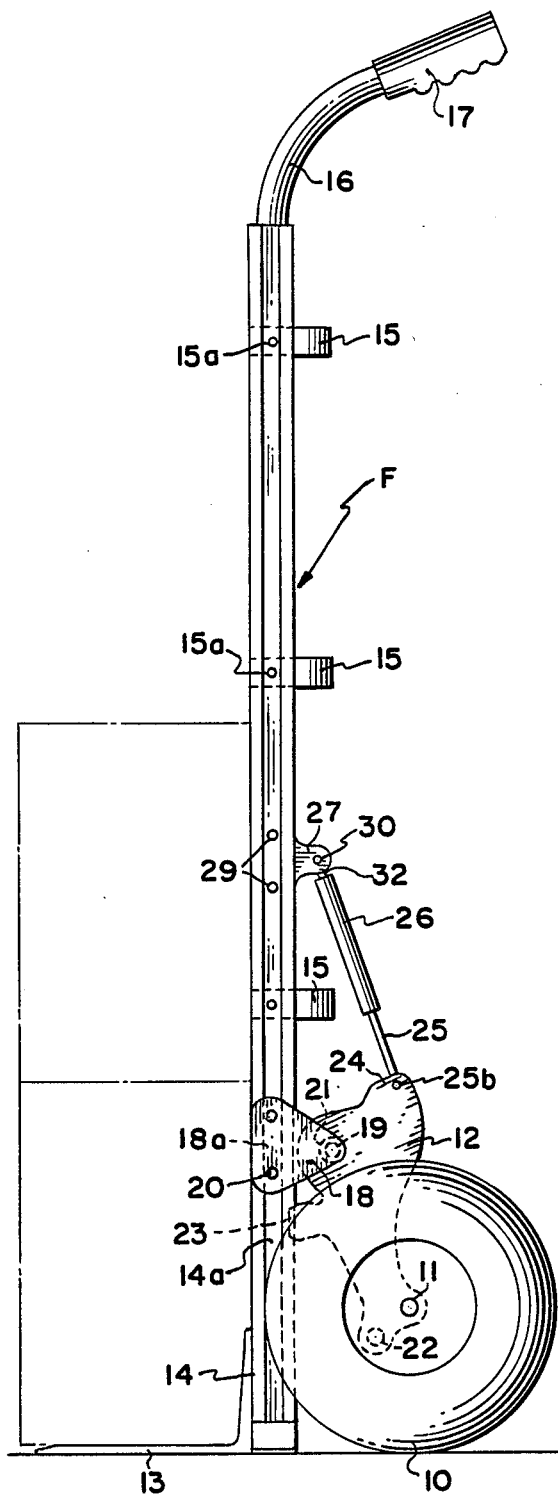
FIG. 1 is a side elevational view of my improved hand truck shown in a loading position.
Figure 2:
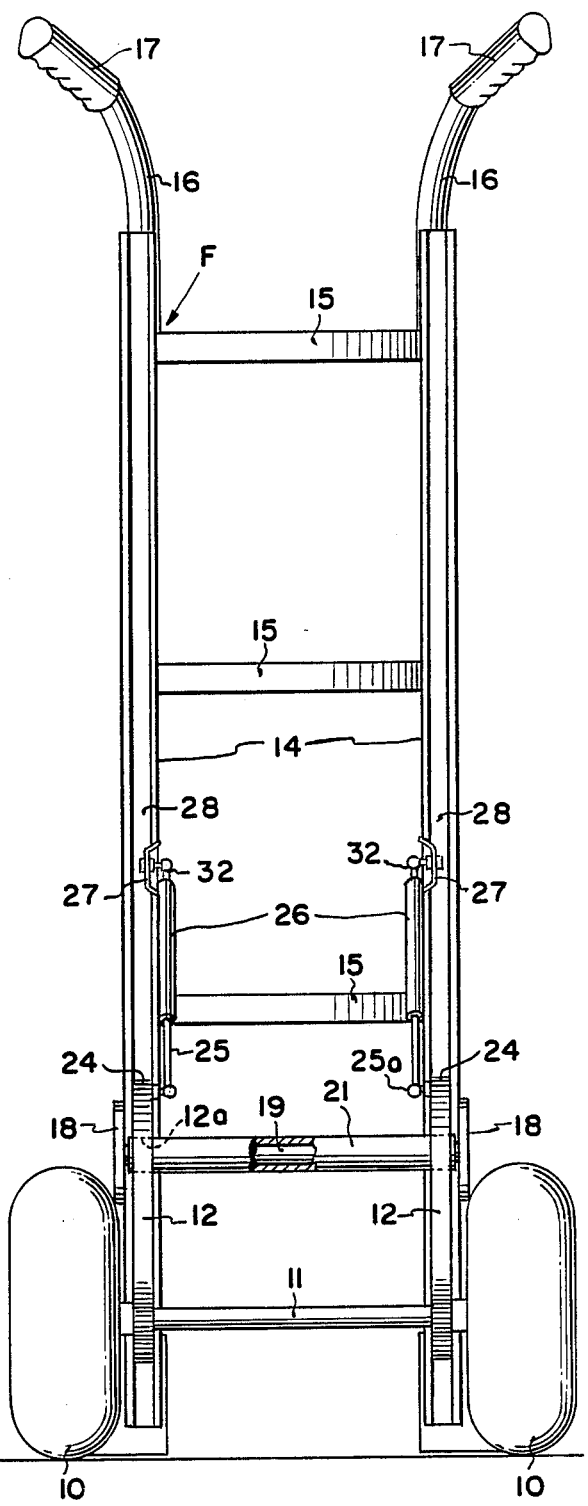
FIG. 2 is a rear elevational view thereof.

Referring now more particularly to the accompanying drawings, the hand truck illustrated is shown as comprising preferably rubber-tired wheels 10, rotatably mounted on a dead axle 11. Side brackets, generally designated 12, and fixed to dead axle 11, extend forwardly from the axle 11 toward a generally rectangular, open frame, generally designated F, the lower end of which a load-supporting nose member 13 affixed in the manner described, for instance, in U.S. Pat. No. 3,997,182.

The frame F is disclosed as having parallel vertical side rails 14, which may be formed of extruded aluminum in a predetermined configuration. Curvilinear braces 15, of the character disclosed in U.S. Pat. No. 4,563,014, span and may be fixed to the side rails in the manner disclosed in that patent, as with screw members 15a. At their upper ends, side rails 14 receive tubular handles 16 which project rearwardly and are provided with handle grips 17 which may be grasped by the user to propel the hand truck in a vertically inclined, load transporting position.

Provided to connect the brackets 12 to the frame side rails 14 in a unique manner, to accomplish the purposes of the invention, are mount plates 18 which have key portions 18a snugly received within the grooves 14a provided in the exterior side faces of rails 14, the plates 18 being mounted in position by screws 20, at a level spaced vertically from the lower end of the frame F, and vertically above the axle 11 in either position of the wheels 10. At a spaced distance rearwardly of the side rails 14, each mount plate 18 carries a fixed shaft 19 which extends between the mount plates 18.

Provided in each bracket 12 is an opening 12a, receiving a tubular sleeve 21 which is received on the shaft 19 and can pivot with respect to it. The brackets 12 are welded, or otherwise suitably affixed, to the ends of sleeve 21. Each of the brackets 12 also provides a second axle opening 22 which is optionally useable to mount the brackets 12 on axle 11, when, for instance, smaller diameter wheels 10 are to be used.

Figure 3:
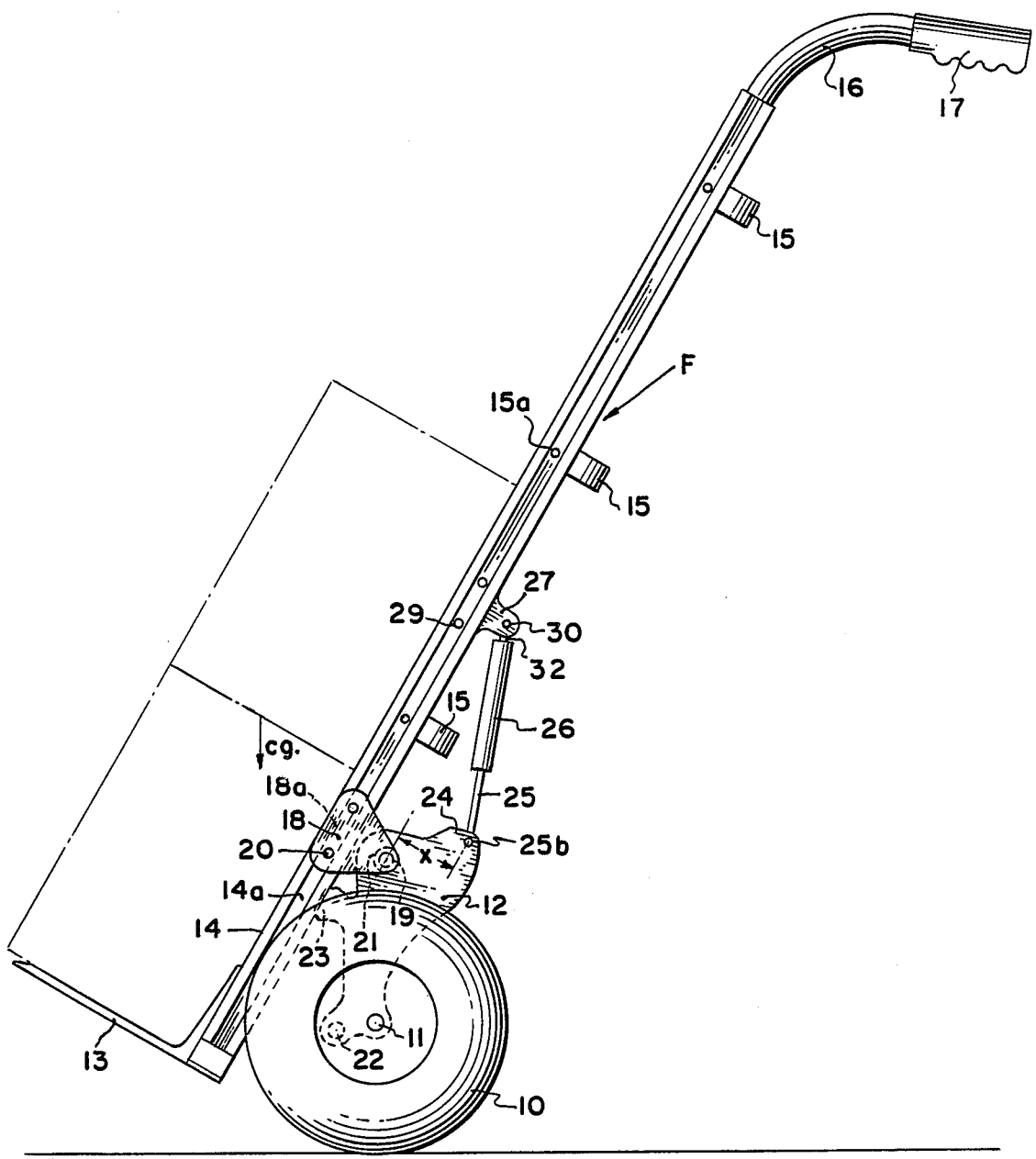
FIG. 3 is a side elevational view similar to FIG. 1, except that the hand truck has been tilted to a transport position.
Figure 4:
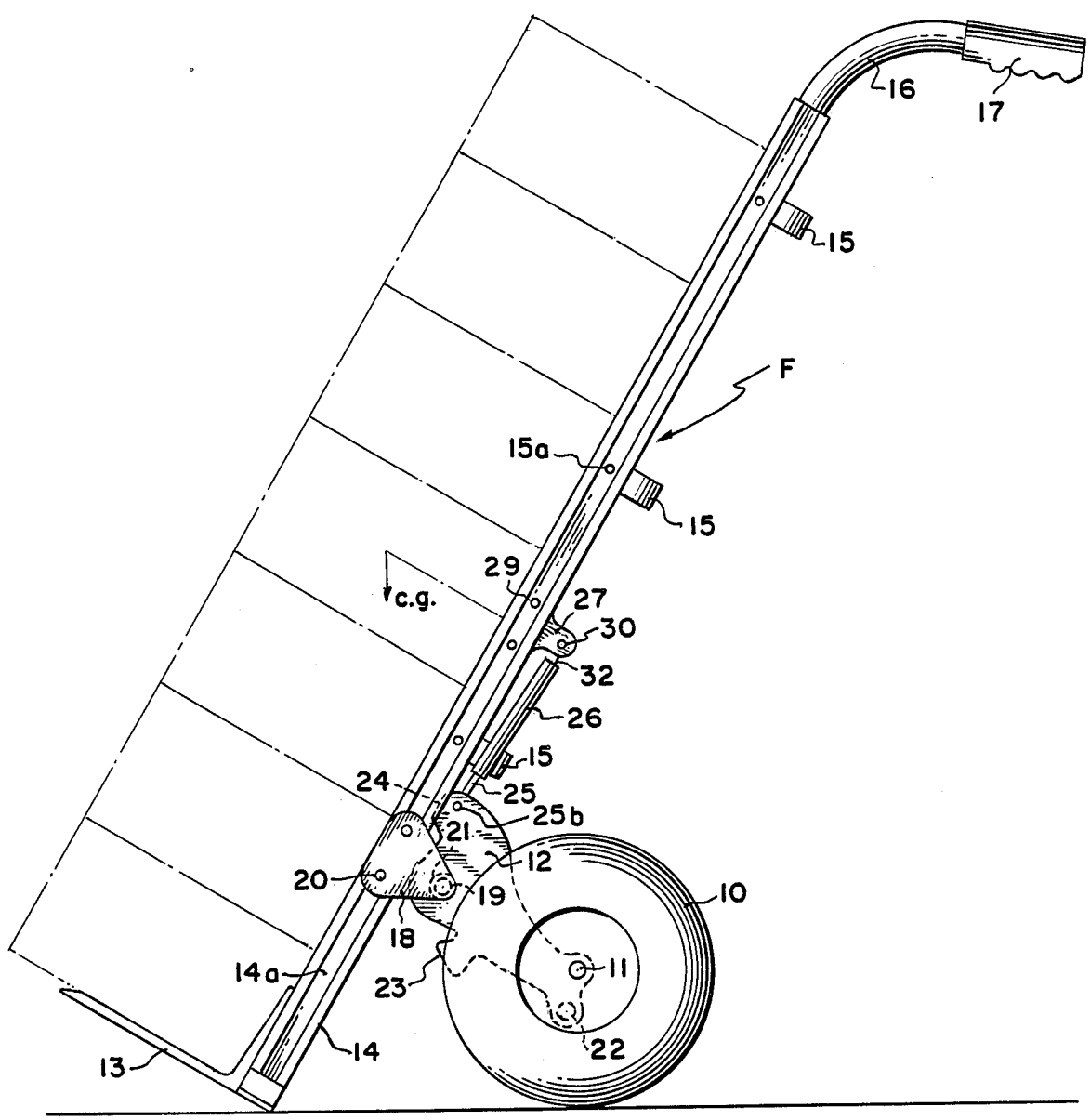
FIG. 4 is a side elevational view similar to FIG. 3, except that the wheel structure has been repositioned to facilitate the transfer of loads having a relatively higher center of gravity.

As FIGS. 3–5 particularly indicate, each bracket 12 is provided with a first, lower rail-engaging pad 23, and a second, upper rail engaging pad 24 which function not only as bearing surfaces, but also as stop surfaces to define the two different positions of the wheels 10 shown in FIGS. 3 and 4, respectively, the pad 23 being in engagement with the side rails 14 in FIG. 3, and the pad 24 being in engagement with the side rails 14 in FIG. 4. It will be observed that pads 23 and 24 are disposed on opposite sides of the pivot shaft 19, and that the pads 23 and 24 are displaced in the range of 60° to 75° apart. When the pads 23 or 24 are in load-bearing engagement with the rails 14 at a spaced distance forwardly of pivot shaft 19, they provide an added stability.

Pivotally connected to each of the brackets 12 at, or adjacent to, the pad 24, is the piston rod 25 of a conventional gas cylinder 26 which pivotally connects to each frame side rail 14 in a manner which will be described. At its bracket connecting end, each piston rod 25 is formed with an eye 25a which is pivotally received on a pin 25b projecting laterally from the inner face of the bracket 12.

Provided well above the mounts 18, are cylinder mounts, generally designated 27, which are of angle shape as shown. The front base portions of plates 27 are received within grooves or channels 28, formed in the inner faces of rails 14, and are secured to the rails 14 by screws 29. The opposite rearwardly projecting ends of the mounts 27 are provided with pins 30, which receive sockets 31 provided on the projections 32 which extend integrally with the cylinder 26. It is to be understood that gaseous pressure within each of the cylinders 26 exerts a constant pressure on the piston rods 25, and yieldably resists any compression of the piston rods 25 into the cylinders or casings 26. Typically, cylinders 26, for instance, may incorporate a gas under a pressure of 70 p.s.i. When the brackets 12 move from the FIG. 3 to the FIG. 4 position, the cylinders 26 typically are pivoted about 30° about pivots 30. In the FIG. 3 position, the gas cylinders 26 resist compression of the piston rods 25, and, accordingly, movement of the upper ends of brackets 12 forwardly toward the frame F about pivot shaft 19. This resistance force is applied through a moment arm x which extends rearwardly from pivot shaft 19 (see FIG. 3). In the FIGS. 4 and 5 position, the pivot pins 25b on brackets 12 are displaced forwardly. Thus, the resistance to compression of each piston rod 25 operates on a moment arm y, to releasably lock brackets 12 in the FIGS. 4 and 5 position.

THE OPERATION

With the hand truck loaded as in FIGS. 1 and 3, with, for example, two beer kegs weighing in the neighborhood of 326 pounds, the center of gravity will be slightly to the left of the wheel axle 11, and the truck will be in a virtually balanced condition for easiest transport of the load. If a different load, having a relatively higher center of gravity were to be carried with the wheels 10 in the same position, for example, seven cases of soft drink boxes weighing in the neighborhood of 309 pounds, the center of gravity of the load would be vertically located a substantial distance behind the axle 11.

To achieve a condition of balance, and greater ease in transporting the load, the operator can, once some of the load is placed on the nose member 13, place his foot on the sleeve 21, and press it forwardly. This pressure will cause the brackets 12 to pivot about the shaft 19 as the pressure exerted by the foot forces the piston rods 25 inwardly, and moves the brackets 12 from the position in which they are normally releasably locked in FIG. 1, to the position shown in FIGS. 4 and 5, in which the wheels 10 are displaced a substantial distance rearwardly from the lower end of the rails 14. Once the brackets 12 swing beyond "center", (i.e., beyond the shaft 19), the cylinders 26 assist the brackets 12 to complete their pivoting action, to a position in which pads 24 prevent further forward movement.

In this relative position of the brackets 12 and cylinders 26, any return pivoting movement of the brackets 12 would need to compress rods 25, and this resistance to compression is exerted through a lever arm y. Thus, in moving between the FIG. 3 and FIG. 4 positions, the brackets 12 move from a position in which pads 23 are in load-bearing, stopped engagement with the rails 14, to a position in which pads 24 are in load-bearing, stopped engagement with the rails 14. As previously indicated, the cylinders 26 also function to maintain the brackets 12 in the FIG. 3 position, this resistance to movement operating through a moment arm x in the case of each cylinder 26.

From the foregoing description of the improvements which are incorporated in my novel hand truck, and the unique method in which it operates, it will be clear that I have invented a hand truck which combines versatility with convenience and operator safety. In both positions of the wheels 10, the gas cylinders 26 operate to maintain them in releasably locked position, in a manner which does not rely upon operator manipulated mechanical fasteners.

While one embodiment of the invention has been described in detail, it will be apparent to those skilled in the art that the disclosed embodiment may be modified. Therefore, the foregoing description in all aspects is to be considered exemplary rather than limiting in any way, and the true scope of the invention is that defined in the following claims.

I claim:

1. In a two-wheeled hand truck structure incorporating an elongate upright frame adapted in use to assume a vertically inclined position and mounting a load-supporting forwardly projecting nose at its lower end, a pair of spaced apart wheel support brackets connected to the lower end of said frame above said nose and projecting rearwardly thereof, an axle connecting said brackets, and a pair of wheels, each rotatably mounted on an end of the axle, there being graspable means provided on the frame at its upper end, the improvement wherein:

a. pivot means pivotally connects said brackets to the frame for movement from a first load-supporting position in which the wheels are adjacent the lower end of the frame for supporting loads with a relatively lower center of gravity, to a second load-supporting position in which the wheels and axle are moved materially rearward for supporting loads with a relatively higher center of gravity; and b. yieldable pressure exerting means connects between said brackets and frame at a spaced vertical distance from the connection of said brackets to said frame, and at a spaced distance rearward of said pivot means when the brackets are in said first position to provide a predetermined, overcomeable, locking resistance exerted through a first moment arm lying on one side of said pivot means to pivoting movement of said brackets in a direction to swing said brackets to said second position, said yieldable pressure exerting means providing a predetermined overcomeable locking resistance when said brackets are in said second load supporting position, exerted through a second moment arm lying on the opposite side of said pivot means to pivoting movement of said brackets in a direction to swing said brackets and wheels forwardly.

2. The invention of claim 1 in which said pivot means is spaced rearwardly of said frame.

3. The invention of claim 2 in which said yieldable pressure exerting means is connected to said frame at a spaced vertical distance above the said pivot means and comprises gas cylinder means which must be compressed to move the brackets out of either first or second load-supporting position.

4. The invention of claim 1 in which a cross member fixedly connects said brackets at said pivot means.

5. The invention of claim 4 in which said cross member comprises a sleeve through which said pivot means extends.

6. In a two-wheeled hand truck structure incorporating an open framework, upright frame comprising extruded spaced apart side rails joined by brace rails, and by a load supporting nose member which projects forwardly from the lower end of the rail, a pair of wheel support brackets connected to the lower end of the frame at a spaced distance above said nose member and projecting rearwardly from the frame, an axle connecting said brackets, and a pair of wheels, each mounted on an end of the axle, the frame also having handle means near its upper end; the improvement wherein:
   a. said side rails on their sides are channel-shaped and formed with inset recessed faces, and mount plates have bases fixed to said faces and sections projecting rearwardly from said side rails;
   b. a pivot member spanning said brackets and spaced rearwardly a predetermined distance from said side rails pivotally connects said brackets to said frame for movement from a first load-supporting position in which the wheels are adjacent the lower end of the frame for supporting loads with a relatively lower center of gravity, to a second load-supporting position in which the wheels and axle are moved materially rearward for supporting loads with a relatively higher center of gravity;
   c. a yieldable, constant pressure exerting, gas cylinder with an extending piston rod pivotally connected between each rail and bracket, there being a support plate extending rearwardly from each side rail at a spaced distance above said mount plates and mounting each gas cylinder to a support plate at a spaced distance above said pivot member, each gas cylinder connecting to one of said brackets at a spaced distance rearwardly of said pivot member when the brackets are in said first position to provide a predetermined, overcomeable, resistance exerted through a predetermined moment arm to pivoting movement of said brackets in a direction to swing the upper end of said yieldable pressure exerting means forwardly toward said frame, and said brackets and wheels to said second position;
   d. spaced apart, first and second stop surfaces on said brackets for engaging said side rails and halting said brackets in said first and second positions; said gas cylinders attaching to said brackets at said second stop surface so as to provide a predetermined, overcomeable locking resistance exerted through a second moment arm lying forwardly of said pivot member to pivoting movement of said brackets in a direction to swing said brackets and wheels rearwardly when said brackets are in said second position; and
   e. there being a fixed shaft connecting said mount plates and said pivot member comprising a fixed sleeve around said shaft spanning and connected to said brackets to function as a foot-manipulatable, actuating step.

7. The invention of claim 6 wherein said gas cylinders swing in the range of about 30° in the travel of said brackets from first to second positions.

8. The invention of claim 6 wherein said first and second stop surface comprise radially protruding pads having surfaces conforming with said side rails spaced apart about 60° to 75°.

9. A method of repositioning a two-wheeled hand truck structure incorporating an elongate upright frame adapted in use to assume a vertically inclined position and mounting a load-supporting forwardly projecting nose at its lower end, a pair of wheel support brackets connected to the lower end of said frame above said nose and projecting rearwardly thereof, an axle connecting said brackets, and a pair of wheels, each rotatably mounted on an end of the axle, there being graspable means provided on the frame at its upper end, and pivot means pivotally connecting said brackets to the frame for movement from a first load-supporting position in which the wheels are adjacent the lower end of the frame for supporting loads with a relatively lower center of gravity, to a second load-supporting position in which the wheels and axle are moved materially rearward for supporting loads with a relatively higher center of gravity and there, also, being yieldable gas cylinder means pivotally connected between said brackets and frame at a spaced vertical distance from the connection of said brackets to said frame, and at a spaced distance rearward of said pivot means when the brackets are in said first position to provide a predetermined, overcomeable, locking resistance exerted through a first moment arm lying on one side of said pivot means to pivoting movement of said brackets in a direction to swing said brackets to said second position: the steps of:
   a. applying a restraining load on said nose tending to restrain movement of said frame;
   b. applying a pivoting pressure on said brackets causing initial compression of said gas cylinder means to permit said brackets to move from said first load supporting position toward said second load supporting position and then causing expansion of said gas cylinder means to assist said movement.

10. The method of claim 9 wherein said gas cylinder means provides a predetermined overcomeable locking resistance exerted through a second moment arm lying on the opposite side of said pivot means to pivoting movement of said brackets in a direction to swing said brackets and wheels in the return direction.

11. A method of retaining, in either of two positions, a repositionable two-wheeled hand truck structure incorporating an elongate upright frame adapted in use to assume a vertically inclined position and mounting a load-supporting forwardly projecting nose at its lower end, a pair of wheel support brackets connected to the lower end of said frame above said nose and projecting rearwardly thereof, an axle connecting said brackets, and a pair of wheels, each rotatably mounted on an end of the axle, there being graspable means provided on the frame at its upper end, and pivot means pivotally connecting said brackets to the frame for movement from a first load-supporting position in which the wheels are adjacent the lower end of the frame for supporting loads with a relatively lower center of gravity, to a second load-supporting position in which the wheels and axle are moved materially rearward for supporting loads with a relatively higher center of gravity comprising:

a. applying a yieldable predetermined pressure to said brackets exerted through a first moment arm lying on one side of said pivot means to pivoting movement of said brackets in a direction to swing said brackets to said second position, and through a second moment arm lying on the opposite side of said pivot means to pivoting movement of said brackets in a direction to swing said brackets and wheels forwardly when the brackets are in said second position.

12. In a two-wheeled hand truck structure incorporating an elongate upright frame adapted in use to assume a vertically inclined position and mounting a load-supporting forwardly projecting nose at its lower end, a pair of wheel support brackets connected to the lower end of said frame above said nose and projecting rearwardly thereof, an axle connecting said brackets, and a pair of wheels, each rotatably mounted on an end of the axle, there being graspable means provided on the frame at its upper end, the improvement wherein:

a. pivot means pivotally connects said brackets to the frame for movement from a first load-supporting position in which the wheels are adjacent the lower end of the frame for supporting loads with a relatively lower center of gravity, to a second load-supporting position in which the wheels and axle are moved materially rearward for supporting loads with a relatively higher center of gravity; and b. energy storing yieldable pressure exerting means connects between said brackets and frame at a spaced vertical distance from the connection of said brackets to said frame, and at a spaced distance rearward of said pivot means when the brackets are in said first position to provide an initial predetermined, overcomeable, locking resistance exerted through a first moment arm lying on one side of said pivot means to pivoting movement of said brackets in a direction to swing said brackets to said second position, and then to automatically assist further movement to said second position.

* * * * *